(12) United States Patent
Lin

(10) Patent No.: US 6,691,965 B1
(45) Date of Patent: Feb. 17, 2004

(54) SUPPORT DEVICE FOR A SUNSHADE

(75) Inventor: Paul Lin, Yung-Kang (TW)

(73) Assignee: Macauto Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/298,513

(22) Filed: Nov. 19, 2002

(51) Int. Cl.[7] ................................................ A47H 1/13
(52) U.S. Cl. ........................... 248/274.1; 248/292.14; 248/299.1
(58) Field of Search ................................ 248/266, 273, 248/267, 269, 270, 271, 272, 274.1, 288.11, 292.14, 299.1

(56) References Cited

U.S. PATENT DOCUMENTS

| | | | | |
|---|---|---|---|---|
| 576,769 A | * | 2/1897 | Williams | |
| 600,535 A | * | 3/1898 | Homan | |
| 1,546,739 A | * | 7/1925 | Le Lande | |
| 1,995,656 A | * | 3/1935 | Stout | 248/19 |
| 5,547,305 A | * | 8/1996 | Treche | 403/97 |
| 5,964,443 A | * | 10/1999 | Leveille | 248/478 |
| 6,079,683 A | * | 6/2000 | Lin | 248/292.12 |
| 6,123,305 A | * | 9/2000 | Lukasavitz | 248/292.12 |
| 6,409,411 B1 | * | 6/2002 | Crorey | 403/97 |

* cited by examiner

Primary Examiner—Korie Chan
Assistant Examiner—Steven Marsh
(74) Attorney, Agent, or Firm—Baker Botts L.L.P.

(57) ABSTRACT

A support device for mounting a sunshade on a platform, and includes a mount member secured on the platform, an angle adjusting member pivoted to the mount member so as to be rotatable relative to the mount member, and an anchoring member mounted movably on an adjusting segment of the angle adjusting member and adapted to anchor an elongate housing of the sunshade. A positioning member is disposed on the anchoring member and is retainingly displaceable between proximate and distal adjusting regions on the adjusting segment so as to enable adjustment of angular position of the anchoring member. By rotating the angle adjusting member relative to the mount member, the anchoring member as well as the sunshade can be adjusted to a desired height.

4 Claims, 8 Drawing Sheets

US 6,691,965 B1

SUPPORT DEVICE FOR A SUNSHADE

BACKGROUND OF THE INVENTION

1. Field of the Invention

This invention relates to a support device for mounting a sunshade on a rear window shelf of a vehicle, more particularly to a support device for mounting a rear window sunshade, which is easily operable to adjust the inclination and height of the sunshade.

2. Description of the Related Art

A conventional sunshade device, which is installed on a rear window shelf of a vehicle for shading the interior of the vehicle from sunlight, generally includes a mount member secured on the rear window shelf, and an angle adjusting member which has a lower end pivoted to the mount member and a holding portion extending from the lower end upwardly and retainingly rotatable relative to the mount member. A base housing of a sunshade is secured on the holding portion for receiving retractably a screen. Thus, the screen can be adjusted to a desired inclination by turning the holding portion relative to the mount member.

Since the mount member is required to extend across the rear window shelf so that the screen can be pulled to cover the whole window, it is inconvenient to install the mount member on the rear window shelf when there are car accessories, such as an audio system (not shown) mounted on and projecting the rear window shelf.

SUMMARY OF THE INVENTION

The object of the present invention is to provide a support device for mounting a sunshade on a platform, which is operable to adjust the inclination and height of the sunshade.

According to this invention, the support device includes a mount member, an angle adjusting member, a retaining member, and a positioning member. The mount member includes a bottom portion which is adapted to be secured on a platform, and a pivot portion which extends upwardly from the bottom portion. The angle adjusting member includes a pivot segment which is connected pivotally to the pivot portion such that the pivot segment is rotatable relative to the pivot portion about a pivot axis in a longitudinal direction, a connecting segment which extends from the pivot segment in a radial direction relative to the pivot axis, and an adjusting segment which extends from the connecting segment, which terminates at a distal end, and which has proximate and distal adjusting regions that are respectively proximate to and distal from the connecting segment. The proximate and distal adjusting regions are angularly displaced from each other about a center axis that is parallel to the pivot axis. The retaining member is disposed to restrain rotation of the pivot segment relative to the pivot portion. The anchoring member is mounted movably on the adjusting segment, and is adapted to anchor an elongate housing of a sunshade. The anchoring member includes a lower portion with two sides opposite to each other in a transverse direction relative to the longitudinal direction, and front and rear walls which extend respectively and upwardly from the sides of the lower portion and which respectively terminate at front and rear edges that are spaced apart from each other in the transverse direction so as to confine therebetween a clearance for passage of a screen of the sunshade therethrough. A positioning member is disposed on the rear wall, and is retainingly displaceable between the proximate and distal adjusting regions so as to enable adjustment of angular position of the anchoring member relative to the angle adjusting member.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
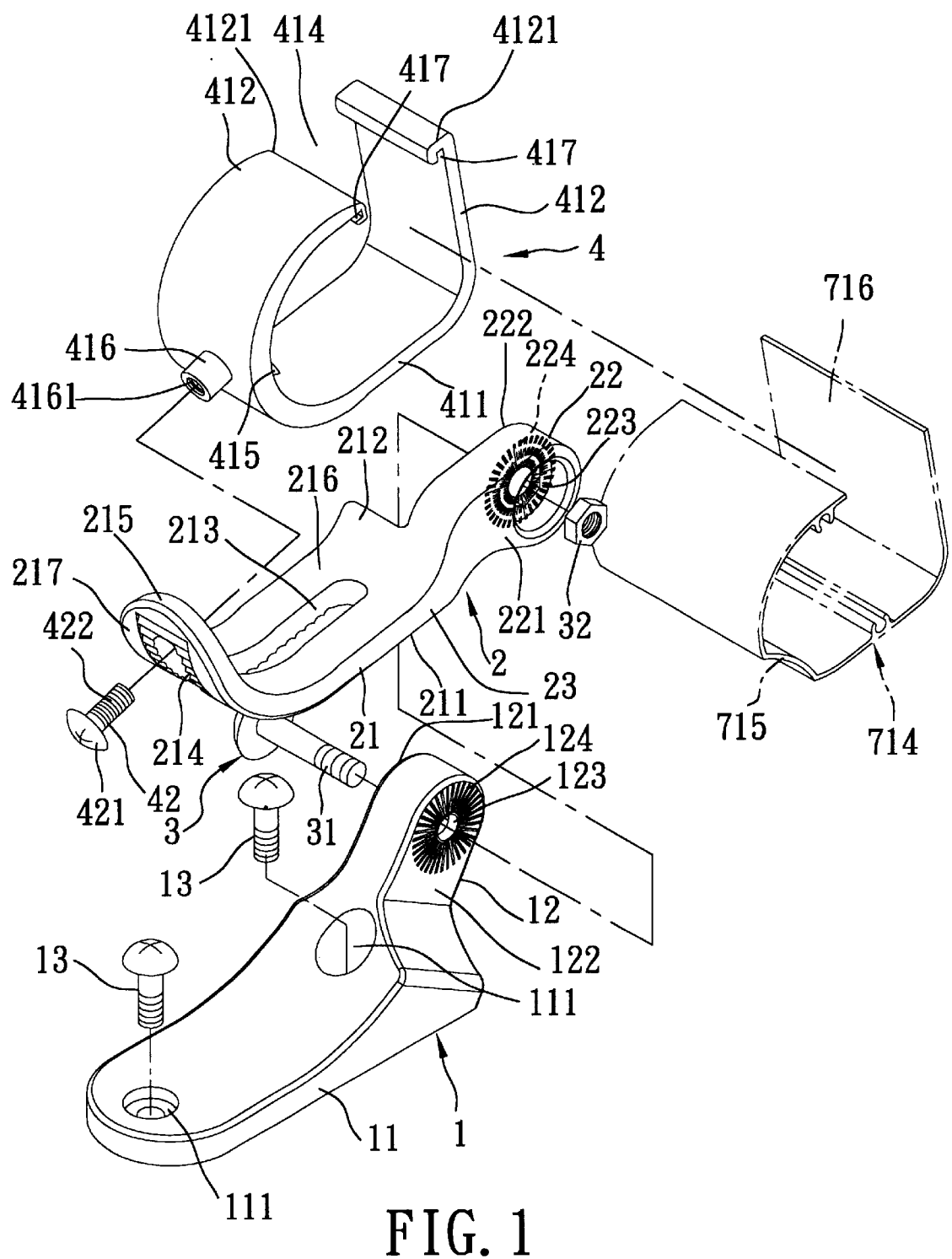
FIG. 1 is an exploded perspective view of a preferred embodiment of a support device according to this invention.
Figure 2:
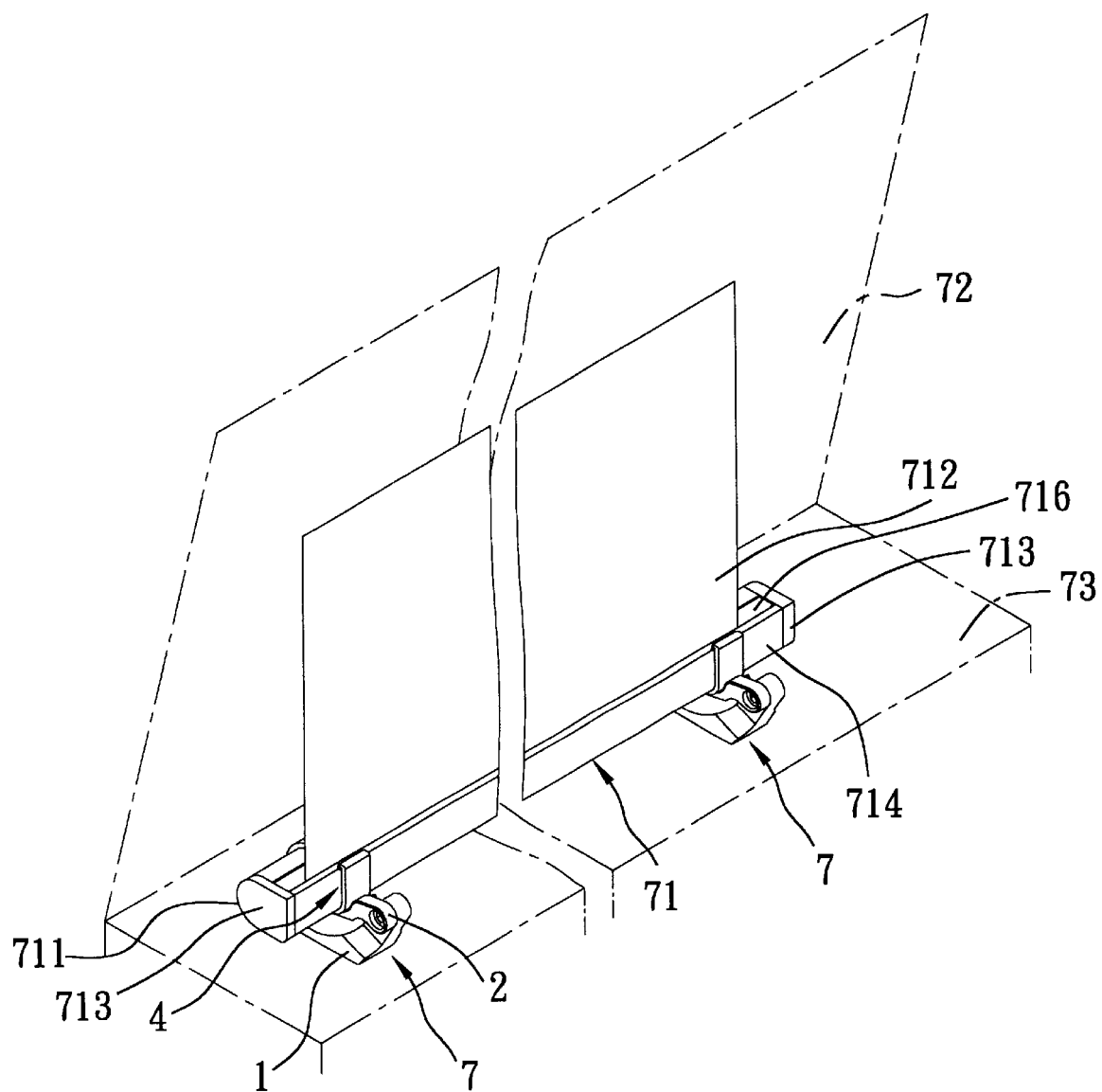
FIG. 2 is a perspective view showing the preferred embodiment mounted on a rear window shelf of a vehicle.
Figure 3:
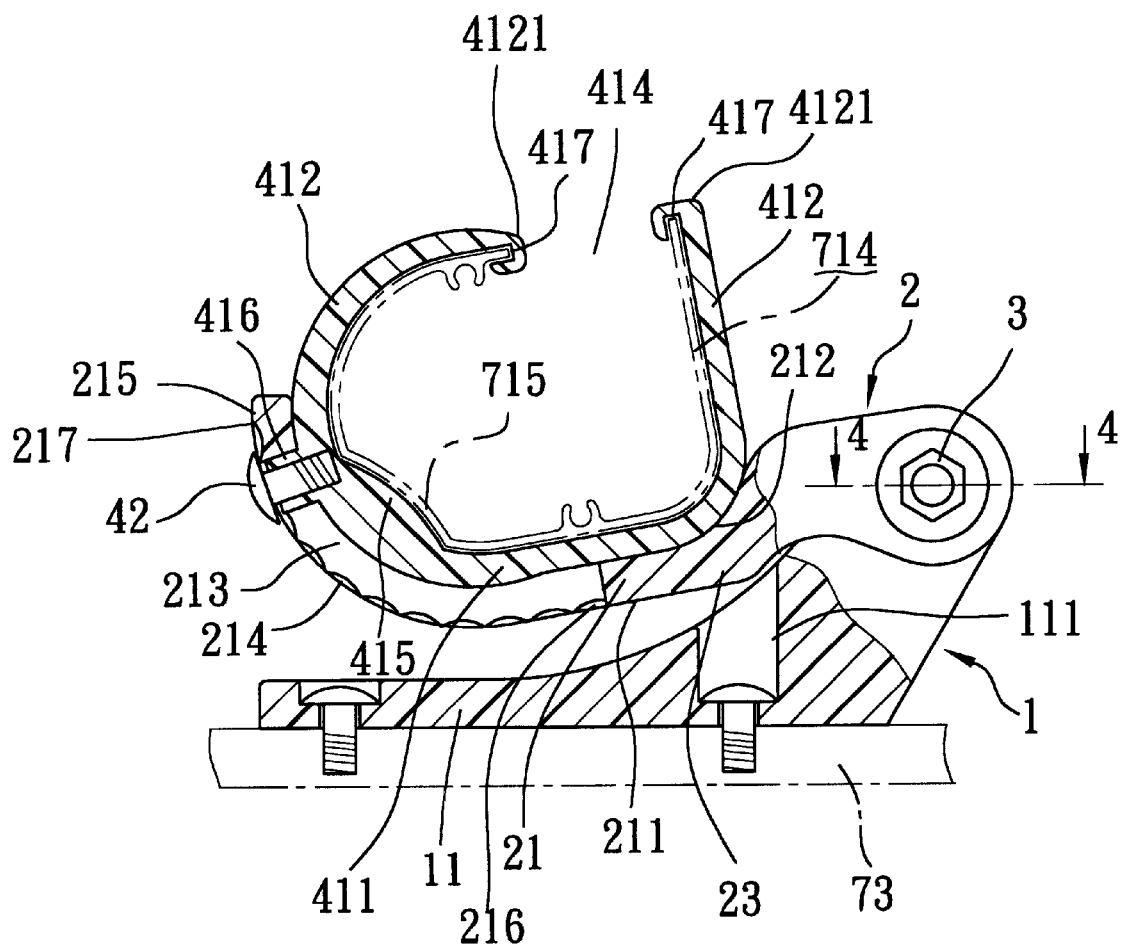
FIG. 3 is a sectional view of the preferred embodiment.

Referring to FIGS. 1 to 3, the preferred embodiment of a support device 7 according to the present invention is shown to be installed on a rear window shelf 73 in front of a rear window 72 of a vehicle for mounting a sunshade 71. The sunshade 71 includes a hollow elongate housing 711 which extends in a longitudinal direction, and a screen 712 which is retractably received in the housing 711 and which is pullable out of the housing 711 from an upper opening 716 formed therein. The housing 711 includes a hollow receiving body 714 for receiving a reel mechanism (not shown) for reeling the screen 712, and two end caps 713 mounted on two opposite ends of the receiving body 714. Although two support devices 7 are shown to be mounted on the rear window shelf 73 in FIG. 2, one will be sufficient for mounting the sunshade 71.

The support device 7 is shown to comprise a mount member 1, an angle adjusting member 2, a retaining member 3, and an anchoring member 4.

The mount member 1 includes a bottom portion 11 which is secured on the rear window shelf 73 by screw fasteners 13 that pass through bores 111 in the bottom portion 11 to engage the rear window shelf 73, and a pivot portion 12 which extends upwardly from the bottom portion 11. The pivot portion 12 includes a first outer wall surface 121 and a first mesh wall surface 122 which are disposed opposite to each other in the longitudinal direction, a first pivot hole 123 which extends from the first outer wall surface 121 through the first mesh wall surface 122, and a plurality of first teeth 124 which are formed on the first mesh wall surface 122 and which surround the first pivot hole 123.

The angle adjusting member 2 is made from an elongate plate, and includes a pivot segment 22, a connecting segment 23 and an adjusting segment 21.

Figure 4:
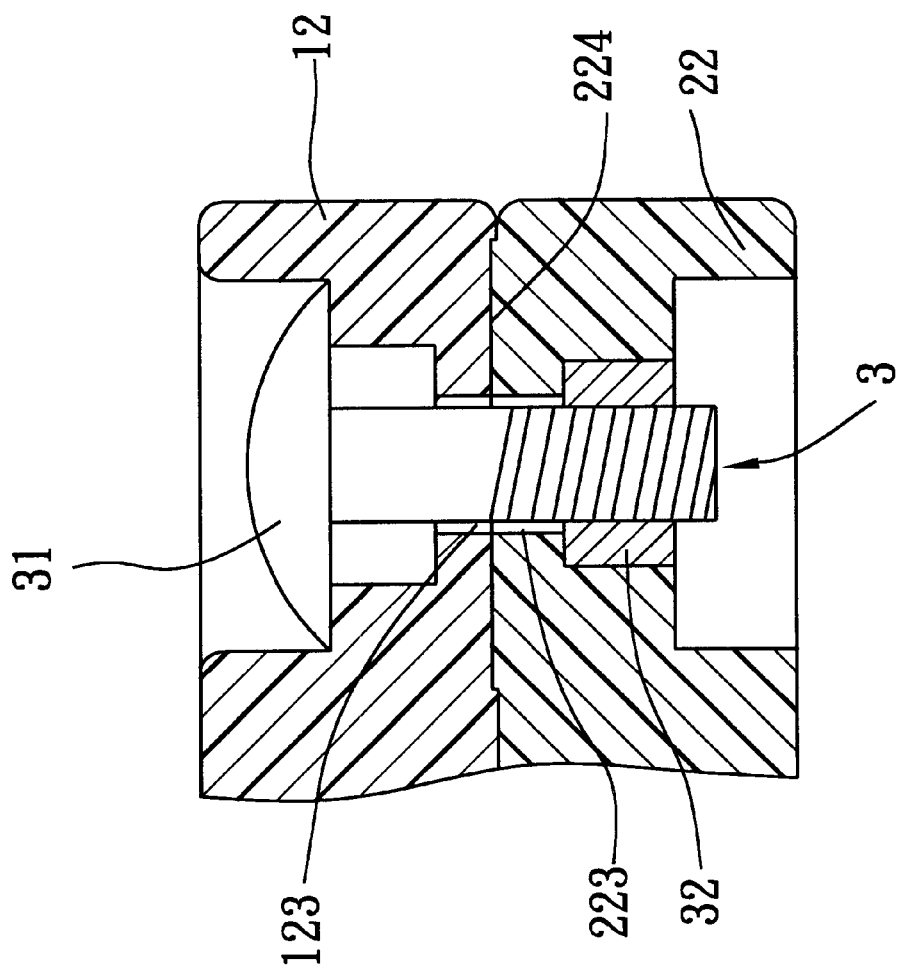
FIG. 4 is a partly cross-sectional view taken along lines 4—4 of FIG. 3.

The pivot segment 22 includes a second outer wall surface 221 and a second mesh wall surface 222 which are disposed opposite to each other in the longitudinal direction, a second pivot hole 223 which extends from the second outer wall surface 221 through the second mesh wall surface 222, and which is registered with the first pivot hole 223 along a pivot axis in the longitudinal direction, and a plurality of second teeth 224 which are formed on the second mesh wall surface 222, which surround the second pivot hole 223, and which are meshed with the first teeth 124. With reference to FIG. 4, the retaining member 3 includes a pivot bolt 31 which has a shank that passes through the first and second pivot holes 123, 223 and that is formed with a threaded segment, and a screw nut 32 which engages threadedly the threaded segment of the pivot bolt 31 such that the first and second teeth 124, 224 are fully meshed with each other to restrain rotation of the pivot segment 22 relative to the pivot portion 12. As such, the pivot segment 22 is rotatable retainingly relative to the pivot portion 12 about the pivot axis.

The connecting segment 23 extends from the pivot segment 22 in a radial direction relative to the pivot axis.

The adjusting segment 21 extends from the connecting segment 23, terminates at a distal end 215, and has proximate and distal adjusting regions 216, 217 that are respectively proximate to and distal from the connecting segment 23. The proximate and distal adjusting regions 216, 217 are configured to be angularly displaced from each other about a center axis that is parallel to the pivot axis. In addition, the adjusting segment 21 has forward and rearward wall surfaces 212, 211 which are disposed opposite to each other, and proximate to and distal from the bottom portion 11, respectively, and a key slot 213 which extends from the proximate adjusting region 216 to the distal adjusting region 217 and which extends from the forward wall surface 212 through the rearward wall surface 211. A plurality of serrations 214 are formed on the rearward wall surface 211.

The anchoring member 4 is mounted movably on the adjusting segment 21 of the angle adjusting member 2, and is configured to anchor the receiving body 714 of the housing 711 of the sunshade 71. The anchoring member 4 includes a lower portion 411 with two sides opposite to each other in a transverse direction relative to the longitudinal direction, and front and rear walls 412 which extend respectively and upwardly from the sides of the lower portion 411 and which respectively terminate at front and rear edges 4121 that are spaced apart from each other in the transverse direction so as to confine therebetween a clearance 414. The clearance 414 is registered with the opening 716 when the anchoring member 4 anchors the receiving body 714 so that the screen 712 can be pulled out from the housing 711 through the clearance 414. Two retaining grooves 417 are respectively formed in the front and rear edges 4121 so as to retain the edges of the receiving body 714 therein. Moreover, the receiving body 714 and the rear wall 412 are respectively formed with matching arcuate protrusions 715, 415 that engage each other to thereby position the receiving body 714 on the anchoring member 4.

A positioning member includes a stud 416 which is formed on the rear wall 412, which is inserted slidably through the key slot 213 from the forward wall surface 212, and which has a threaded hole 4161 formed therein, and a screw bolt 42 which includes a head 421 that abuts against the rearward wall surface 211, and a shank 422 that extends from the head 421 and that passes through the key slot 213 to threadedly engage the threaded hole 4161 so as to retain the anchoring member 4 relative to the angle adjusting member 2. By means of the serrations 214, the frictional force between the head 421 and the rearward wall surface 211 can be increased.

Figure 5:
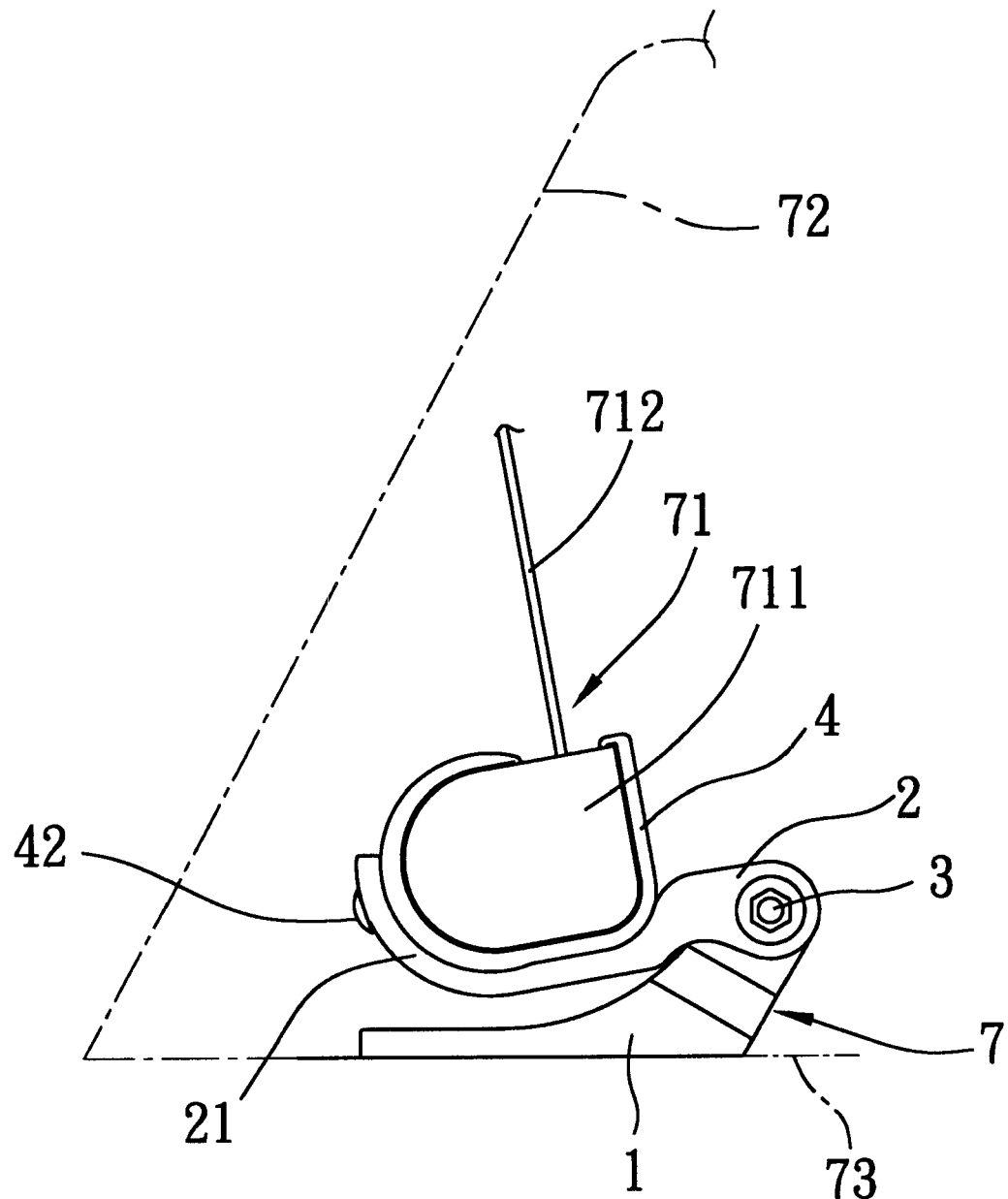
FIG. 5 is a schematic side view showing the preferred embodiment prior to adjustment.
Figure 6:
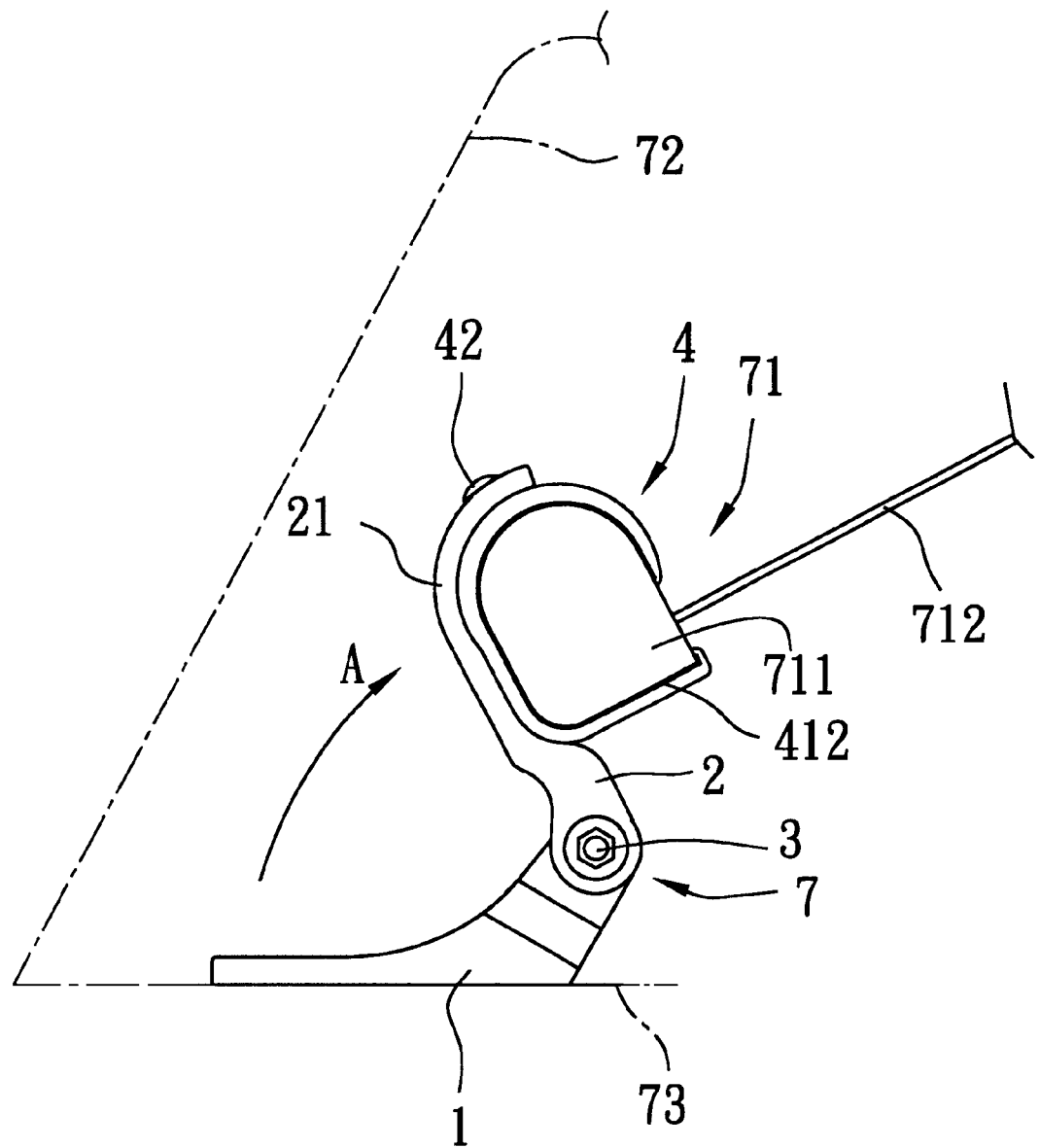
FIG. 6 is a schematic side view showing the preferred embodiment in a first state of adjustment.
Figure 7:
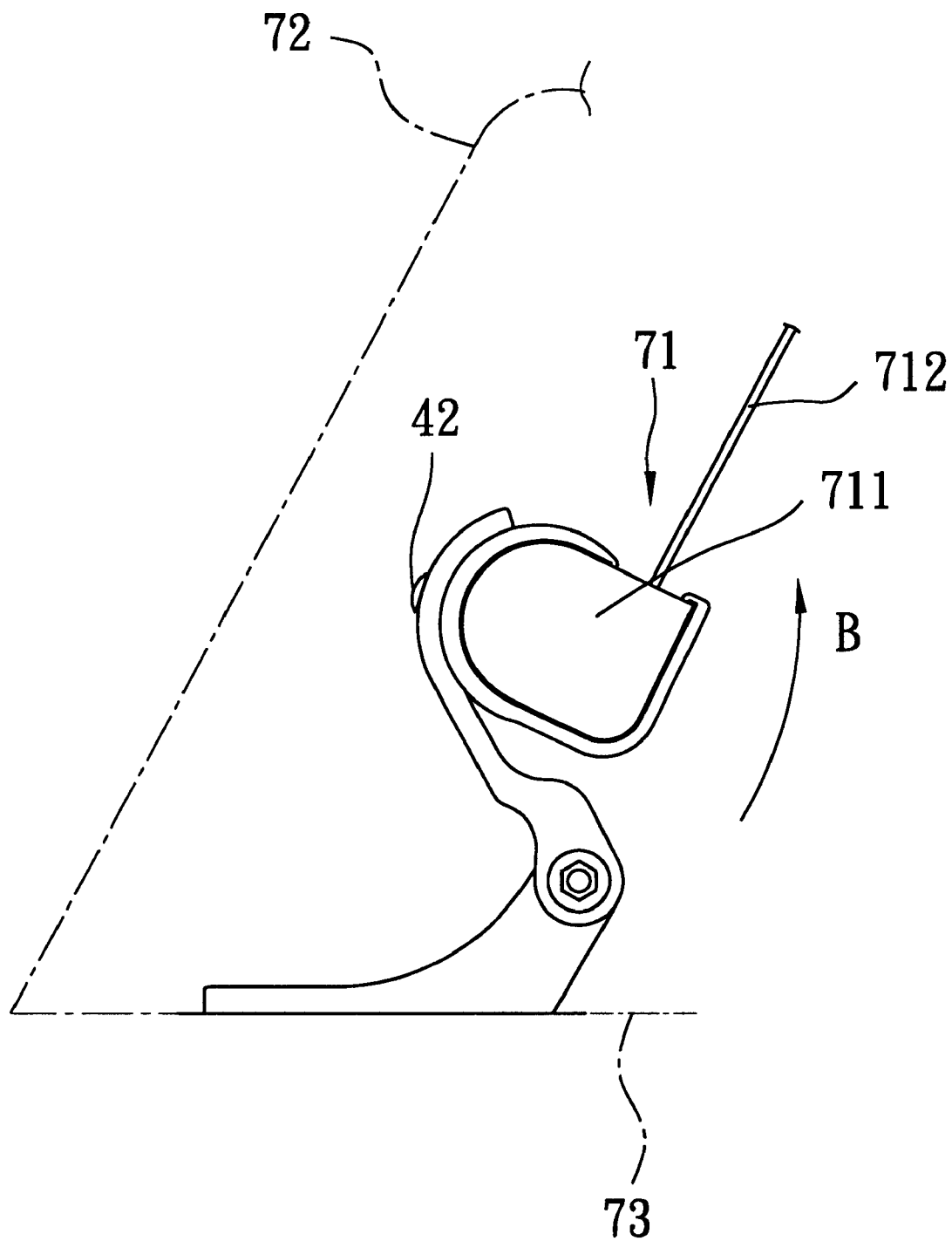
FIG. 7 is a schematic side view showing the preferred embodiment in a second state of adjustment.
Figure 8:
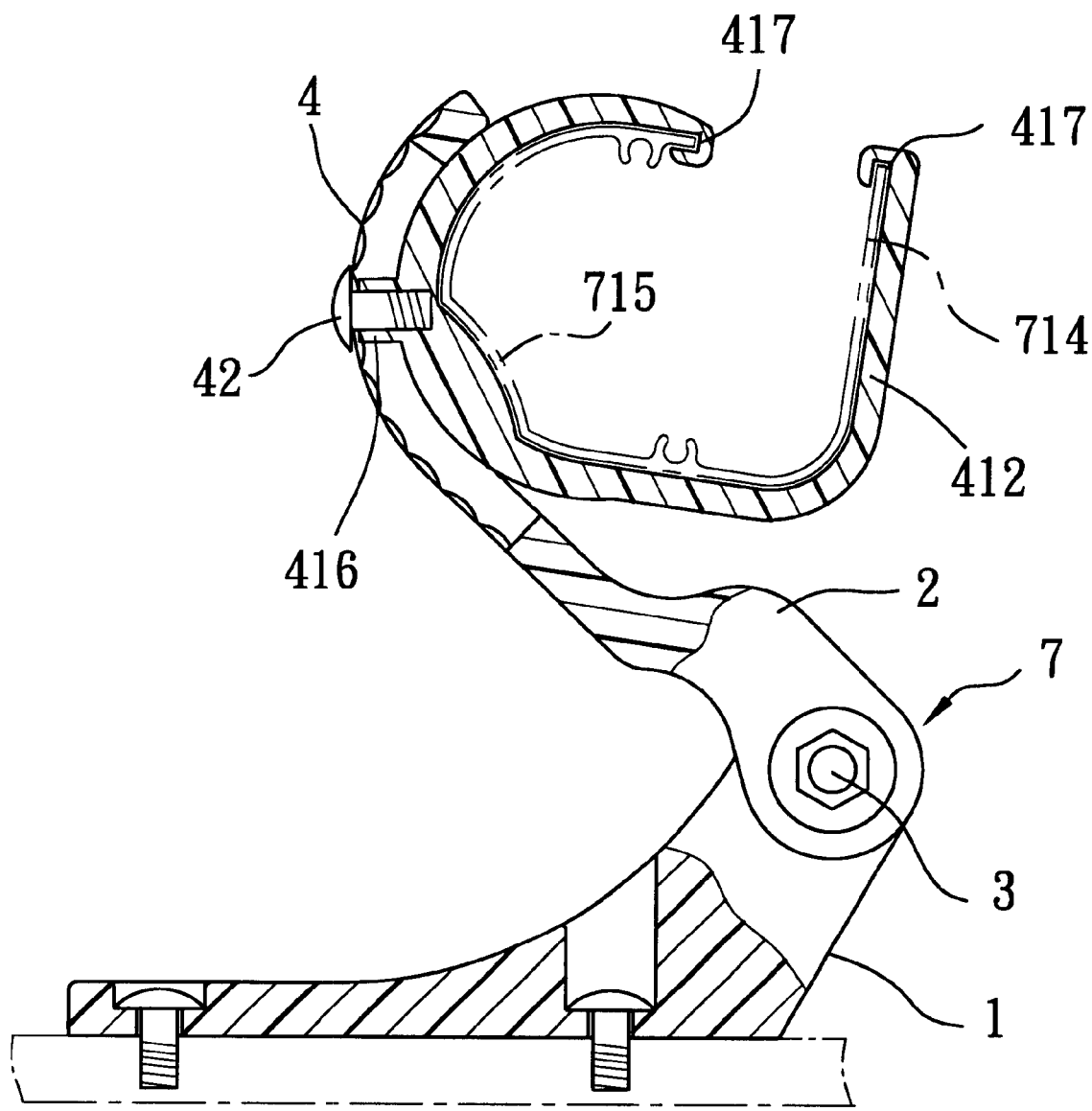
FIG. 8 is a sectional view showing the preferred embodiment in the second state of adjustment.

Prior to adjustment, referring to FIGS. 3 and 5 which show the support device 7 of this embodiment in an assembled state, the angle adjusting member 2 is disposed at a lowest position, and the screen 712 is not parallel to the rear window 72. When it is desired to adjust the height and inclination of the screen 71, referring to FIGS. 1, 4 and 6, the retaining member 3 is loosened to permit the pivot segment 22 to rotate in a direction indicated by the arrow (A) in FIG. 6 to a determined height. The retaining member 3 is then tightened once again to prevent rotation of the pivot segment 22 relative to the pivot portion 12. Subsequently, referring to FIGS. 6 to 8, the screw bolt 42 is loosened to permit the stud 416 to slidably displace in the key slot 213 so as to move the anchoring member 4 in a direction indicated by the arrow (B) in FIG. 7, thereby permitting adjustment of the angle of the screen 712 to place the screen 712 in a position parallel to the rear window 72 for shading the interior of the vehicle from sunlight.

As illustrated, the support device of this invention enables adjustment of the sunshade to a desired height and a desired inclination. In addition, the support device can be installed conveniently on the rear window shelf of the vehicle without interference from other car accessories protruding from the rear window shelf.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A support device for mounting a sunshade on a platform, the sunshade including an elongate housing which extends in a longitudinal direction, and a screen which is retractably received in the housing and which is pullable out of the housing, said support device comprising:

a mount member including a bottom portion which is adapted to be secured on the platform, and a pivot portion extending upwardly from said bottom portion;

an angle adjusting member including a pivot segment which is connected pivotally to said pivot portion such that said pivot segment is rotatable relative to said pivot portion about a pivot axis in the longitudinal direction, a connecting segment which extends from said pivot segment in a radial direction relative to the pivot axis, and an adjusting segment which extends from said connecting segment, which terminates at a distal end, and which has proximate and distal adjusting regions that are respectively proximate to and distal from said connecting segment, said proximate and distal adjusting regions being configured to be angularly displaced from each other about a center axis that is parallel to the pivot axis;

a retaining member disposed to restrain rotation of said pivot segment relative to said pivot portion;

an anchoring member mounted movably on said adjusting segment, and adapted to anchor the housing of the sunshade, said anchoring member including a lower portion with two sides opposite to each other in a transverse direction relative to the longitudinal direction, and front and rear walls which extend respectively and upwardly from said sides of said lower portion and which respectively terminate at front and rear edges that are spaced apart from each other in the transverse direction so as to confine therebetween a clearance adapted for the screen to pass therethrough; and a positioning member disposed on said rear wall, and retainingly displaceable between said proximate and distal adjusting regions so as to enable adjustment of angular position of said anchoring member relative to said angle adjusting member.

2. The support device of claim 1, wherein said pivot portion includes a first outer wall surface and a first mesh wall surface which are disposed opposite to each other in the longitudinal direction, a first pivot hole which extends from said first outer wall surface through said first mesh wall surface, and a plurality of first teeth which are formed on said first mesh wall surface and which surround said first pivot hole;

said pivot segment including a second outer wall surface and a second mesh wall surface which are disposed opposite to each other in the longitudinal direction, a second pivot hole which extends from said second outer wall surface through said second mesh wall surface and which is registered with said first pivot hole along the pivot axis, and a plurality of second teeth which are formed on said second mesh wall surface and which surround said second pivot hole and which are meshed with said first teeth;

said retaining member including a pivot bolt which has a shank that passes through said first and second pivot holes and that is formed with a threaded segment, and a screw nut which engages threadedly said threaded segment to bring said first and second teeth to be fully meshed with each other so as to restrain said pivot segment from rotating relative to said pivot portion.

3. The support device of claim 1, wherein said adjusting segment has forward and rearward wall surfaces which are disposed opposite to each other and proximate to and distal from said bottom portion, respectively, and a key slot which extends from said proximate adjusting region to said distal adjusting region and which extends from said forward wall surface through said rearward wall surface, said positioning member including a stud which is formed on said rear wall, which is inserted through said key slot from said forward wall surface, and which has a threaded hole formed therein, and a screw bolt which includes a head that abuts against said rearward wall surface, and a shank that extends from said head and that passes through said key slot to threadedly engage said threaded hole so as to retain said anchoring member relative to said angle adjusting member.

4. The support device of claim 3, wherein said adjusting segment further has a plurality of serrations formed on said lower wall surface so as to increase frictional force between said head of said screw bolt and said rearward wall surface.

* * * * *